(12) United States Patent
Horiuchi et al.

(10) Patent No.: US 10,606,621 B2
(45) Date of Patent: Mar. 31, 2020

(54) ASSISTING USERS TO EXECUTE CONTENT COPIED FROM ELECTRONIC DOCUMENT IN USER'S COMPUTING ENVIRONMENT

(71) Applicant: International Business Machines Corporation, Armonk, NY (US)

(72) Inventors: Yoshio Horiuchi, Hiratsuka (JP); Tsend Ochir Bat Ulzii, Edogawaku (JP); Masaki Saitoh, Yokohama (JP); Tomoko Murayama, Yokohama (JP); Masayuki Yamana, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/973,768

(22) Filed: May 8, 2018

(65) Prior Publication Data

US 2019/0347116 A1 Nov. 14, 2019

(51) Int. Cl.
*G06F 9/451* (2018.01)
*G06F 3/0482* (2013.01)
*G06F 16/93* (2019.01)
*G06F 16/903* (2019.01)

(52) U.S. Cl.
CPC ............ *G06F 9/453* (2018.02); *G06F 3/0482* (2013.01); *G06F 16/90344* (2019.01); *G06F 16/93* (2019.01)

(58) Field of Classification Search
CPC ........ G06F 3/0482; G06F 9/453; G06F 16/93; G06F 16/90344
See application file for complete search history.

(56) References Cited

U.S. PATENT DOCUMENTS

| 9,348,581 | B2 | 5/2016 | Farah et al. |
| 2001/0018696 | A1* | 8/2001 | Hori ...................... G06F 17/211 715/229 |
| 2008/0072209 | A1* | 3/2008 | Farah ...................... G06F 8/10 717/113 |

(Continued)

OTHER PUBLICATIONS

Hypothesis Project, "Hypothesis—The Internet, Peer Reviewed," https://web.hypothes.is, 2017, pp. 1-12.

*Primary Examiner* — Seth A Silverman
(74) *Attorney, Agent, or Firm* — Robert A. Voigt, Jr.; Winstead PC

(57) ABSTRACT

A method, system and computer program product for assisting users to execute content in a user's computing environment. A user copying and pasting content from a first electronic document is detected, where the content is set as a first character string. Furthermore, the modification of the copied content is detected, where the modification includes modification of parameters of the user's computing environment to implement execution of the copied content and the modified copied content is set as a second character string. The first and second character strings as well as the modification points are registered in a repository. The modification points include the modified parameters of the first user's computing environment. By matching the character string copied by a second user from a second electronic document with one of the registered character strings, the second user may be presented with the modification points associated with the matching character string.

20 Claims, 6 Drawing Sheets

(56) References Cited

U.S. PATENT DOCUMENTS

| | | | |
|---|---|---|---|
| 2009/0031205 A1* | 1/2009 | Aureglia | G06F 17/246 |
| | | | 715/217 |
| 2013/0041874 A1 | 2/2013 | Dohm et al. | |
| 2014/0365579 A1 | 12/2014 | Thrasybule et al. | |
| 2015/0370769 A1* | 12/2015 | Pereira Filho | G06F 16/93 |
| | | | 726/28 |

* cited by examiner

ASSISTING USERS TO EXECUTE CONTENT COPIED FROM ELECTRONIC DOCUMENT IN USER'S COMPUTING ENVIRONMENT

TECHNICAL FIELD

The present invention relates generally to copying content from electronic technical documents, and more particularly to assisting users to execute content (e.g., exemplary commands) copied from an electronic technical document in a user's computing environment.

BACKGROUND

User guides or manuals are technical documents provided electronically that contain instructions on how to use a device (e.g., computing device), software, etc. Most user guides include examples to assist the user in understanding the operation of the device, software, etc.

Normally the examples (e.g., exemplary commands) that are provided in the user guides are based on the work environment of the author, the test environment or the reference environment, including the input and output settings for executing the exemplary commands.

Typically, when a user desires to use one of the exemplary commands illustrated in the user guide, the user copies the command into the user's computing environment. For example, the user may copy an exemplary command into a text field in a dialog box. For instance, the user may copy the command of prompting the user to enter a new user's password in the text field in the dialog box.

However, in order to implement the execution of the command in the user's computing environment, various parameter adjustments or other modifications may be required in the user's computing environment.

For less experienced users, it may not be clear what parameters (e.g., location parameters) should be modified and to what extent such parameters should be changed. Even for more experienced users, it may be difficult to comprehend all the parameter modifications to be changed and configuration mistakes are common.

Unfortunately, there is not currently a means for assisting the user in recognizing the parameters that need to be modified and how such modifications should be performed in the user's computing environment in order to implement the execution of an exemplary command copied from an electronic document, such as a user's guide.

SUMMARY

In one embodiment of the present invention, a method for assisting users to execute content in a user's computing environment comprises detecting a first user copying content from a first electronic document, where the content is set as a first character string. The method further comprises detecting a pasting of the copied content into a first user's environment. The method additionally comprises detecting a modification of the copied content, where the modification comprises modification of parameters of the first user's environment to implement execution of the copied content, and where the modification of the copied content is set as a second character string. The method further comprises registering the first and second character strings and differences between the first and second character strings in a repository in response to a difference between the first and second character strings exceeding a threshold value. The method additionally comprises registering modification points and a range of locations in the second character string exhibiting differences from the first character string in the repository in response to the difference between the first and second character strings exceeding the threshold value, where the modification points comprise modifications in the second character string with respect to the first character string, and where the modification points comprise modified parameters of the first user's environment. Furthermore, the method comprises detecting a second user copying content from a second electronic document into a second user's environment. Additionally, the method comprises detecting a selection of a paste operation of the copied content into the second user's environment in response to the copied content matching the first character string in the repository within a threshold degree of agreement. In addition, the method comprises presenting to the second user one or more of the registered modification points associated with the second character string stored in the repository.

Other forms of the embodiment of the method described above are in a system and in a computer program product.

In another embodiment of the present invention, a method for assisting users to execute content in a user's computing environment comprises detecting a first user copying content from a first electronic document, where the content is set as a first character string. The method further comprises detecting a pasting of the copied content into a first user's environment. The method additionally comprises detecting a modification of the copied content, where the modification comprises modification of parameters of the first user's computing environment to implement execution of the copied content, and where the modification of the copied content is set as a second character string. Furthermore, the method comprises registering the first and second character strings and differences between the first and second character strings in a repository in response to a difference between the first and second character strings exceeding a threshold value. Additionally, the method comprises registering modification points and a range of locations in the second character string exhibiting differences from the first character string in the repository in response to the difference between the first and second character strings exceeding the threshold value, where the modification points comprise modifications in the second character string with respect to the first character string, and where the modification points comprise modified parameters of the first user's computing environment. In addition, the method comprises detecting a second user browsing a second electronic document. The method further comprises searching contents in the second electronic document that match the registered first character string in the repository within a threshold degree of agreement. The method additionally comprises identifying the registered modification points in the repository associated with the first character string. Furthermore, the method comprises detecting the second user copying content that matches the registered first character string. Additionally, the method comprises presenting to the second user one or more of the identified registered modification points associated with the first character string stored in the repository.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for assisting users to execute content in a user's computing environment. In one embodiment of the present invention, a first user copying content from an electronic document is detected, where the content is set as a first character string. The pasting of the copied content into the first user's computing environment is then detected. Furthermore, the modification of the copied content is detected, where the modification includes modification of parameters of the first user's computing environment to implement execution of the copied content. Furthermore, the modified copied content is set as a second character string. Additionally, the first and second character strings as well as the differences between the first and second character strings are registered in a repository in response to the difference between the first and second character strings exceeding a threshold value. Furthermore, the modification points and a range of locations in the second character string exhibiting differences from the first character string are registered in the repository in response to the difference between the first and second character strings exceeding the threshold value. The modification points include modifications in the second character string with respect to the first character string. Furthermore, the modification points include the modified parameters of the first user's computing environment. By matching the character string copied by a second user from an electronic document with one of the registered character strings, the second user may be presented with the modification points associated with the matching character string thereby assisting the second user in recognizing the parameters that need to be modified and how such modifications should be performed in the second user's computing environment in order to implement the execution of content (e.g., exemplary command) copied from an electronic document.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
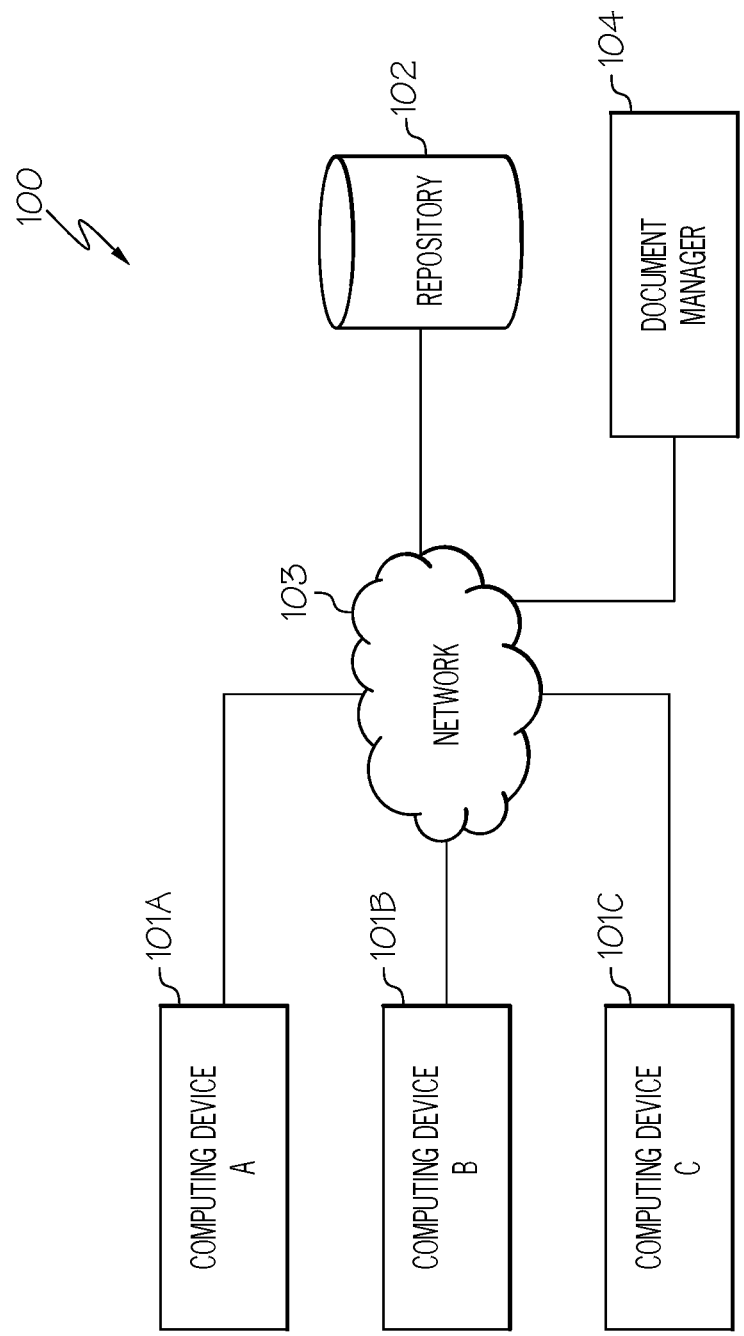
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a document repository 102 via a network 103. Computing devices 101A-101C may collectively or individually be referred to as computing devices 101 or computing device 101, respectively. The user of computing device 101 may also be referenced herein as user 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and document repository 102.

Document repository 102 (also referred to as simply "repository") is a repository or database for storing documents in electronic form. Furthermore, document repository 102 may be configured to store registered character strings, differences between such character strings, modification points and the range of locations in a second character string exhibiting differences from a first character string. "Modification points," as used herein, refer to the modifications in the second character string in comparison to the first character string. The "range of locations in the second string," as used herein, refers to the locations in the second character string containing the modifications.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a document manager 104 connected to repository 102 via network 103. Document manager 104 is configured to manage the documents stored in repository 102. Furthermore, document manager 104 is configured to assist the user (e.g., user of computing device 101) in recognizing the parameters that need to be modified and how such modifications should be performed in the user's computing environment in order to implement the execution of content (e.g., exemplary command) copied from an electronic document, such as a user's guide.

System 100 is not to be limited in scope to any one particular network architecture. System 100 may include any number of computing devices 101, repositories 102, networks 103 and document managers 104. Furthermore, while FIG. 1 illustrates document manager 104 as being a separate physical device, some or all of the functionality of document manager 104, as discussed herein, may reside in computing device 101.

Figure 2:
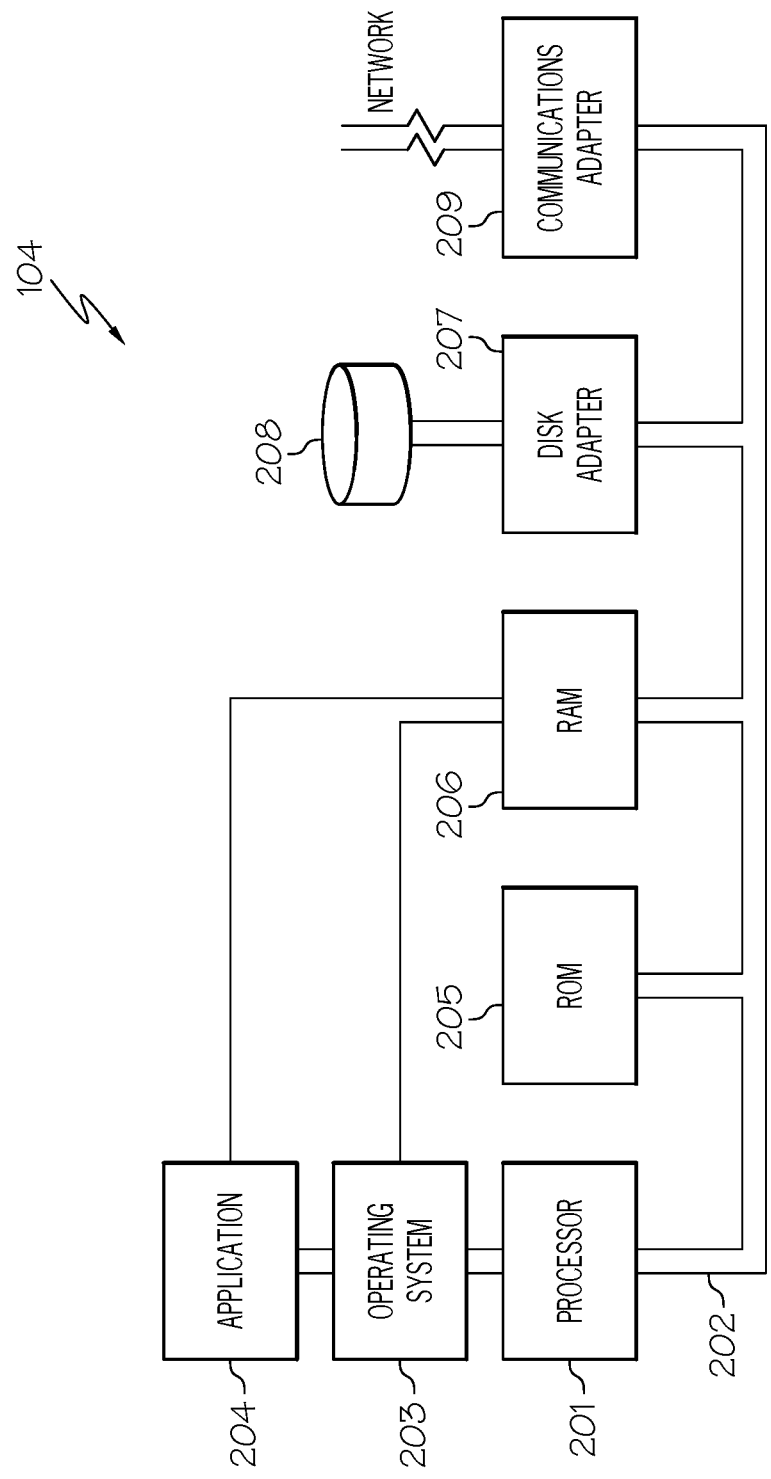
FIG. 2 illustrates an embodiment of the present invention of a hardware configuration of the document manager which is representative of a hardware environment for practicing the present invention.

Referring now to FIG. 2, FIG. 2 illustrates an embodiment of the present invention of a hardware configuration of document manager 104 (FIG. 1) which is representative of a hardware environment for practicing the present invention. Referring to FIG. 2, document manager 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for assisting the user (e.g., user of computing device 101) in recognizing the parameters that need to be modified and how such modifications should be performed in the user's computing environment in order to implement the execution of content (e.g., exemplary command) copied from an electronic document, as discussed further below in connection with FIGS. 3-6.

Referring again to FIG. 2, read-only memory ("ROM") 205 is coupled to system bus 202 and includes a basic input/output system ("BIOS") that controls certain basic functions of document manager 104. Random access memory ("RAM") 206 and disk adapter 207 are also coupled to system bus 202. It should be noted that software components including operating system 203 and application 204 may be loaded into RAM 206, which may be document manager's 104 main memory for execution. Disk adapter 207 may be an integrated drive electronics ("IDE") adapter that communicates with a disk unit 208, e.g., disk drive. It is noted that the program for assisting the user (e.g., user of computing device 101) in recognizing the parameters that need to be modified and how such modifications should be performed in the user's computing environment in order to implement the execution of content (e.g., exemplary command) copied from an electronic document, as discussed further below in connection with FIGS. 3-6, may reside in disk unit 208 or in application 204.

Document manager 104 further includes a communications adapter 209 coupled to bus 202. Communications adapter 209 interconnects bus 202 with an outside network (e.g., network 103 of FIG. 1) thereby allowing document manager 104 to communicate with other devices, such as computing devices 101 and repository 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, typically, when a user desires to use one of the exemplary commands illustrated in the user guide, the user copies the command into the user's computing environment. For example, the user may copy an exemplary command into a text field in a dialog box. For instance, the user may copy the command of prompting the user to enter a new user's password in the text field in the dialog box. However, in order to implement the execution of the command in the user's computing environment, various parameter adjustments or other modifications may be required in the user's computing environment. For less experienced users, it may not be clear what parameters (e.g., location parameters) should be modified and to what extent such parameters should be changed. Even for more experienced users, it may be difficult to comprehend all the parameter modifications to be changed and configuration mistakes are common. Unfortunately, there is not currently a means for assisting the user in recognizing the parameters that need to be modified and how such modifications should be performed in the user's computing environment in order to implement the execution of an exemplary command copied from an electronic document, such as a user's guide.

Figure 3:
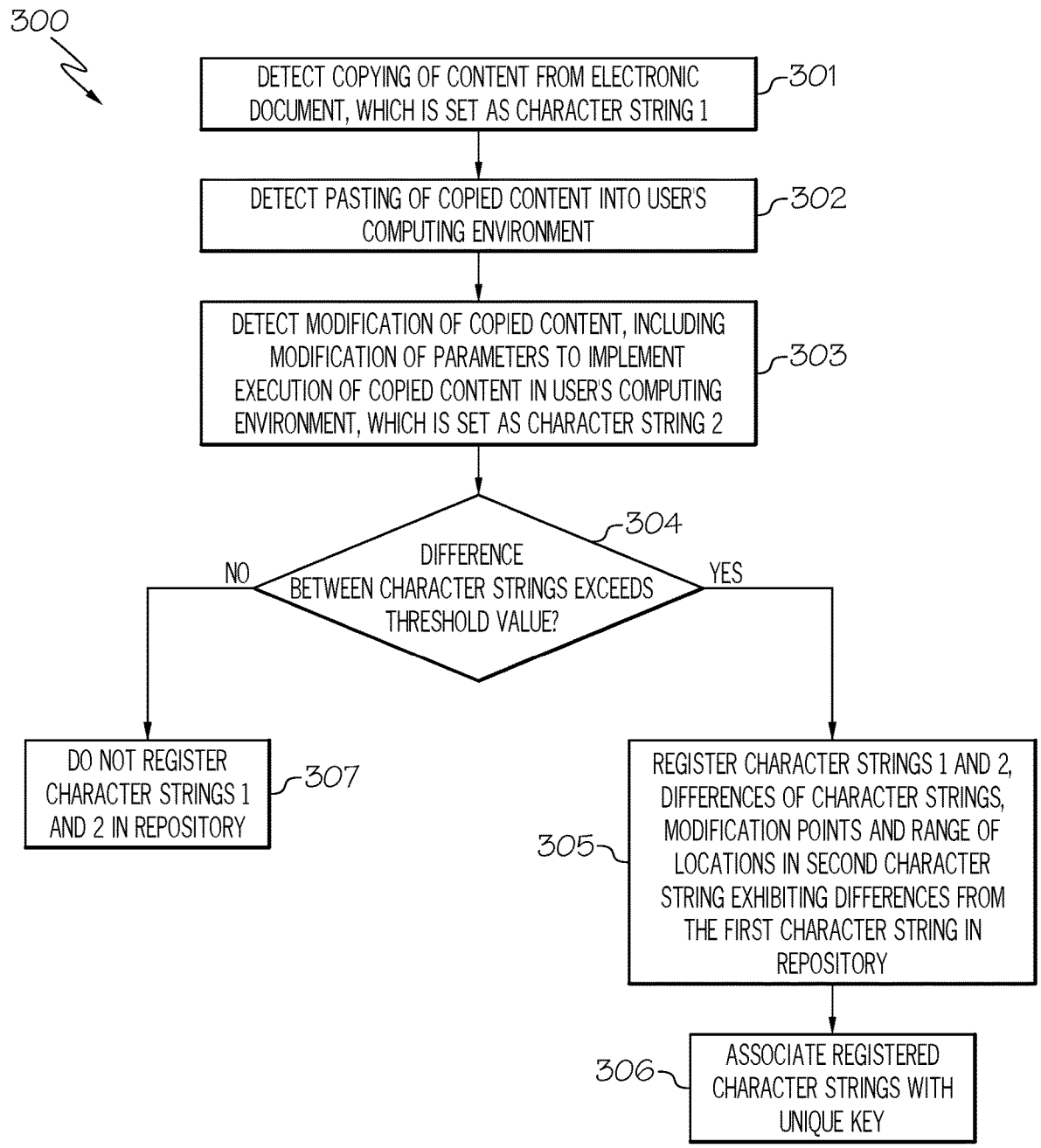
FIG. 3 is a flowchart of a method for registering character strings in a repository in accordance with an embodiment of the present invention.
Figure 4:
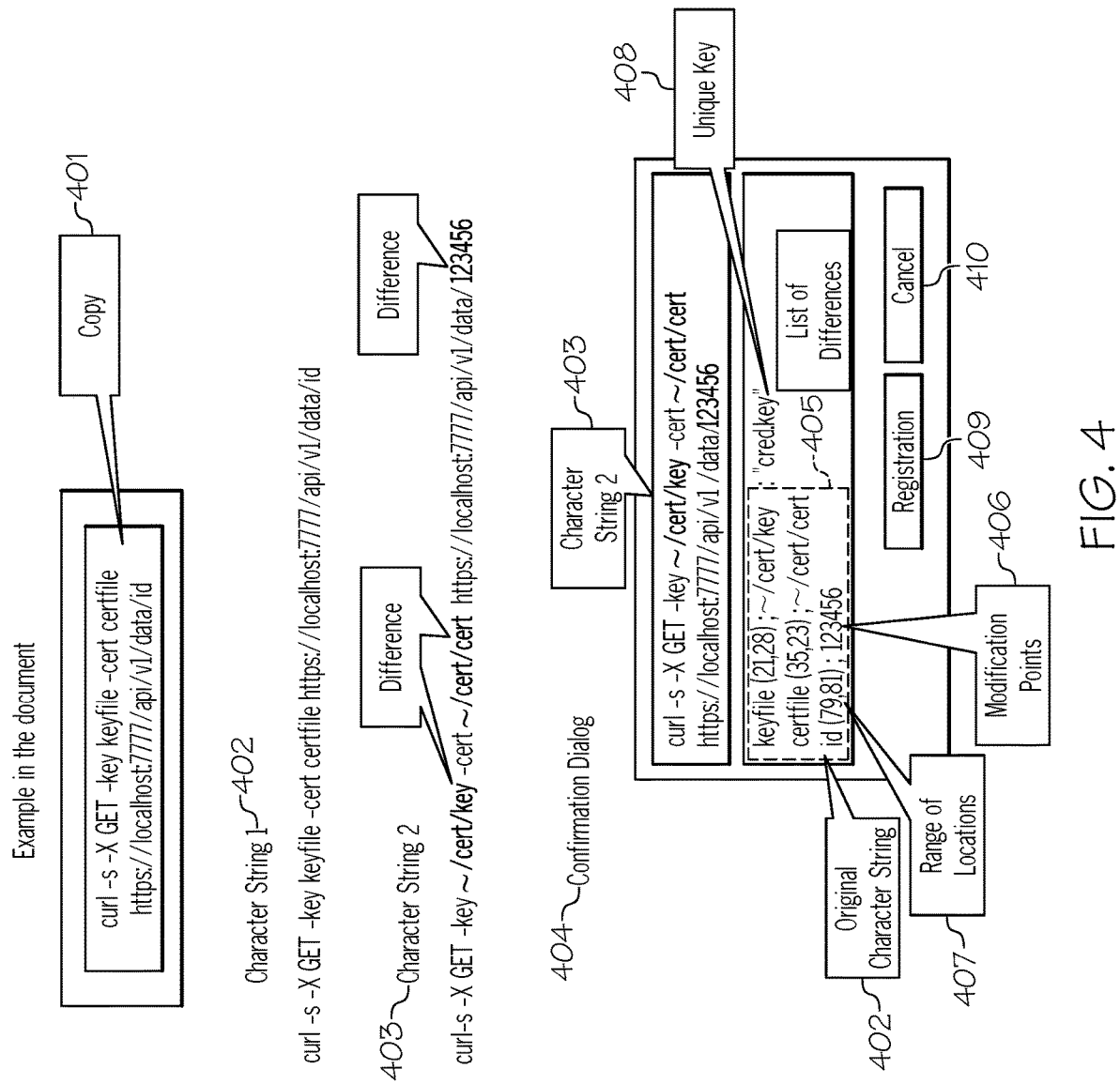
FIG. 4 illustrates registering character strings in the repository in accordance with an embodiment of the present invention.
Figure 5:
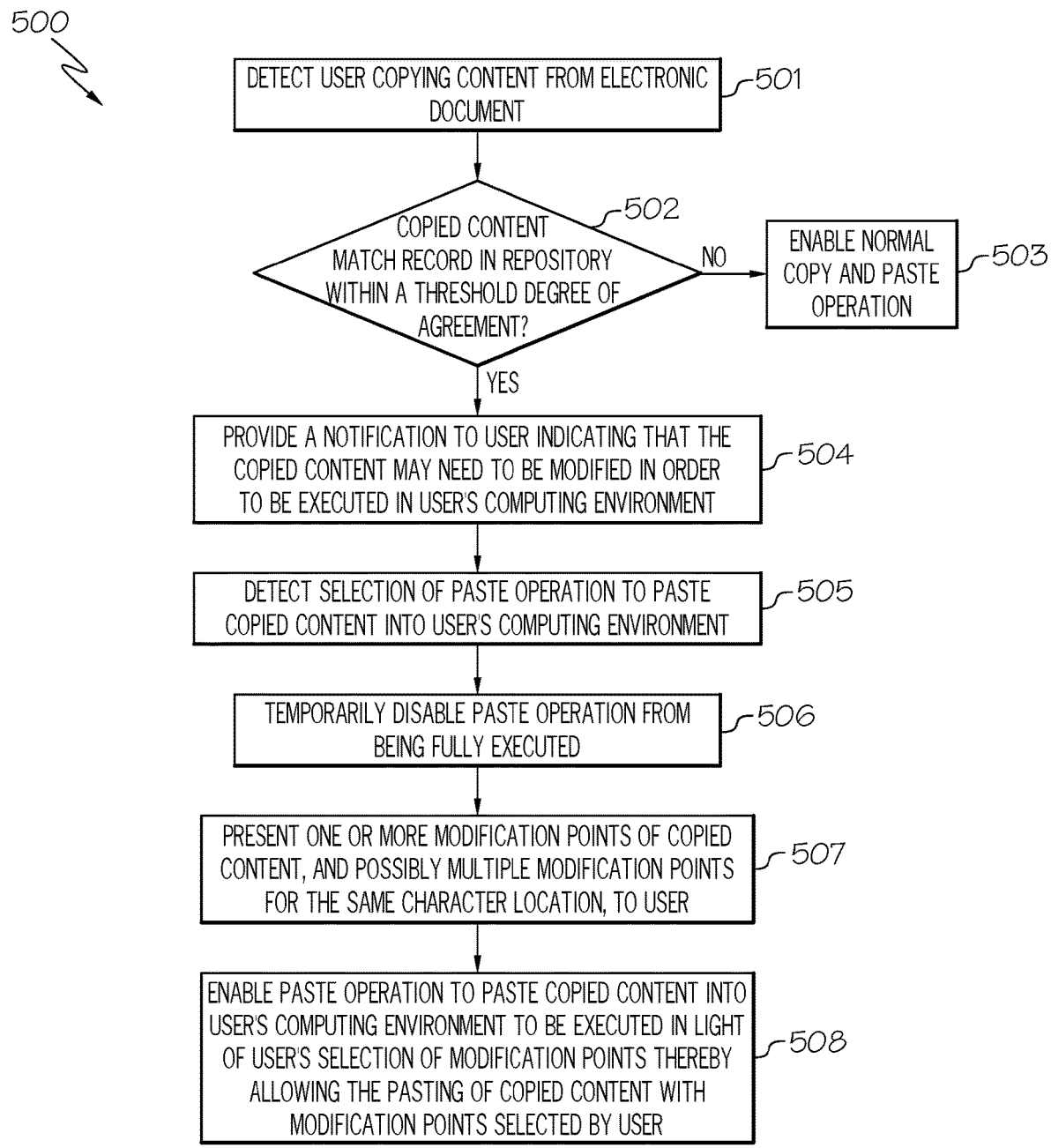
FIG. 5 is a flowchart of a method for assisting the user in executing the content copied from an electronic document by assisting the user in recognizing the parameters that need to be modified and how such modifications should be performed in the user's computing environment in accordance with an embodiment of the present invention.
Figure 6:
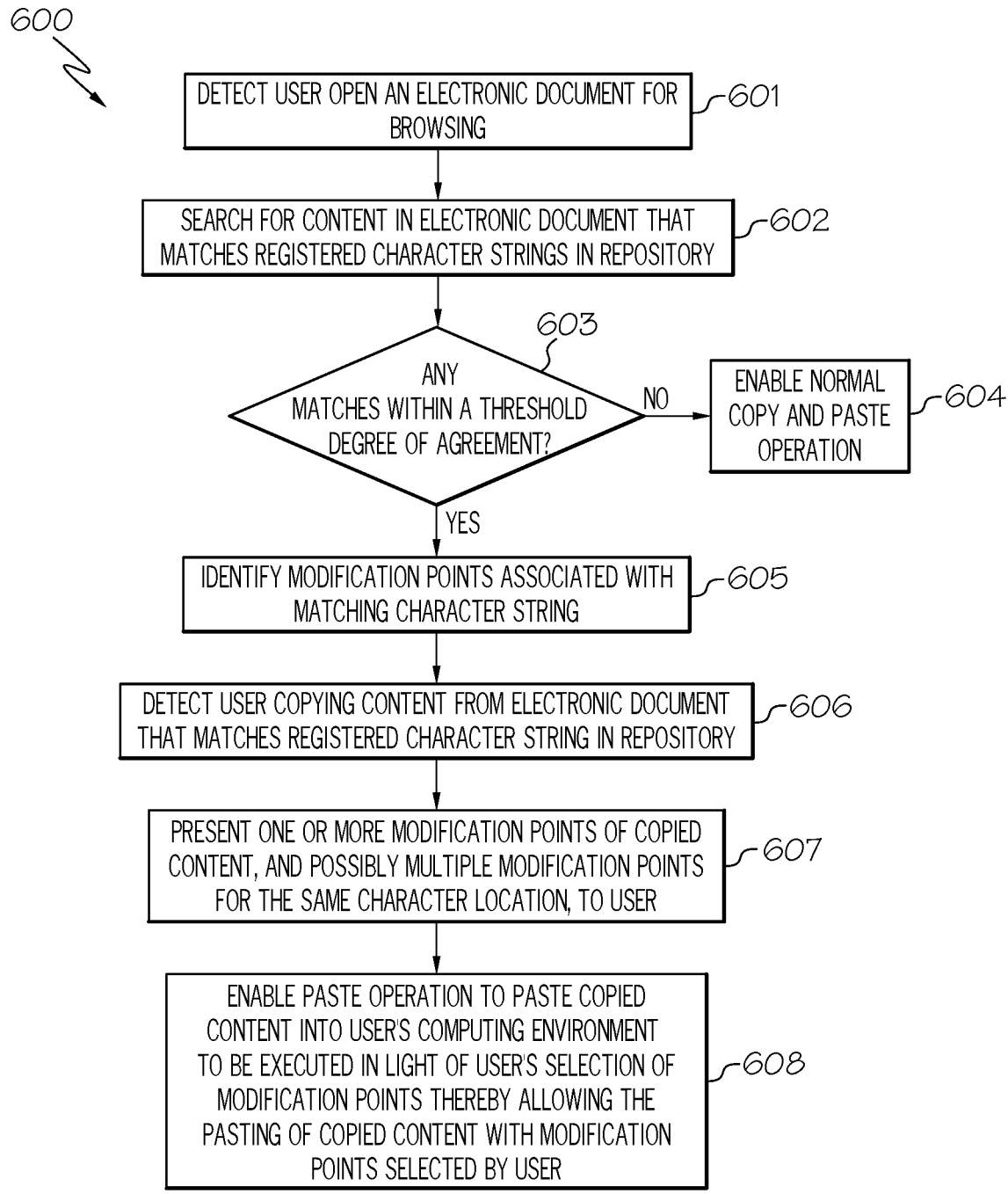
FIG. 6 is a flowchart of an alternative method for assisting the user in executing the content copied from an electronic document by assisting the user in recognizing the parameters that need to be modified and how such modifications should be performed in the user's computing environment in accordance with an embodiment of the present invention.

The principles of the present invention provide a means for assisting the user in recognizing the parameters that need to be modified and how such modifications should be performed in the user's computing environment in order to implement the execution of content (e.g., exemplary command) copied from an electronic document as discussed below in connection with FIGS. 3-6. FIG. 3 is a flowchart of a method for registering character strings in a repository. FIG. 4 illustrates registering character strings in a repository. FIG. 5 is a flowchart of a method for assisting the user in executing the content copied from an electronic document by assisting the user in recognizing the parameters that need to be modified and how such modifications should be performed in the user's computing environment. FIG. 6 is a flowchart of an alternative method for assisting the user in executing the content copied from an electronic document by assisting the user in recognizing the parameters that need to be modified and how such modifications should be performed in the user's computing environment.

As stated above, FIG. 3 is a flowchart of a method 300 for registering character strings in repository 102 (FIG. 1) in accordance with an embodiment of the present invention.

Referring to FIG. 3, in conjunction with FIGS. 1-2, in step 301, document manager 104 detects the copying of content (e.g., exemplary command) from an electronic document (e.g., user guide) by a user 101, which is set as character string 1, as shown in FIG. 4.

FIG. 4 illustrates registering character strings in a repository in accordance with an embodiment of the present invention. As shown in FIG. 4, user 101 copies content from an electronic document corresponding to "curl -s -X GET -key keyfile -cert certfile https://localhost:7777/api/v1/data/id," which is set as character string 1 402.

In one embodiment, document manager 104 also determines the range of the copied content. Range, as used herein, refers to the character length of the character string.

In step 302, document manager 104 detects the pasting of the copied content into the user's computing environment (e.g., console, text field) by user 101.

In step 303, document manager 104 detects the modification of the copied content, including modification of parameters (e.g., input and output settings) to implement the execution of the copied content in the user's computing environment, which is set as character string 2. The user's computing environment, as used herein, refers to the set of packages, variables and files that are present in the computing device of user 101.

For example, as shown in FIG. 4, character string 2 may correspond to "curl -s -X GET -key ~/cert/key -cert ~/cert/cert https://localhost:7777/api/v1/data/123456," where the differences between character strings 1 and 2 are shown in FIG. 4.

In one embodiment, document manager 104 detects user 101 executing the copied content (e.g., exemplary commend), such as by pressing the ENTER key in the console or clicking "OK" in a dialog, collecting the edited content from the paste destination by hook or the like and setting it as character string 2. In one embodiment, in the event that the command fails to execute, document manager 104 may wait for the user to initiate re-execution.

In step 304, a determination is made by document manager 104 as to whether the difference between character strings 1 and 2 exceeds a threshold value, which may be user-selected. In one embodiment, the difference may be determined by document manager 104 by comparing each character in each of the character strings (character strings 1 and 2) and identifying the differences. If the number of such differences exceeds a threshold value, which may be user-selected, then the character strings will be registered as discussed below. In one embodiment, document manager 104 also performs temporal evaluations, determines whether operations were performed with respect to other applications or evaluates other user operations.

If the difference between character strings 1 and 2 exceeds a threshold value, then, in step 305, document manager 104 registers character strings 1 and 2, the differences between the character strings, the modification points and the range of locations in the second character string exhibiting differences from the first character string in repository 102. Modification points, as used herein, refer to the modifications in the second character string with respect to the first character string. In one embodiment, modification points include the modified parameters (parameters of user's computing environment) to enable execution of content (e.g., exemplary command) copied from an electronic document in the user's computing environment. The "range of locations in the second string," refers to the locations in the second character string containing the modifications.

In one embodiment, user 101 is presented with a dialog 404 (communication dialog) as shown in FIG. 4 to provide user 101 the opportunity to confirm registration of the character strings as well as to confirm the differences (list of differences 405 shown in confirmation dialog 404), the modification points 406 and the range of locations 407 in the second character string exhibiting differences from the first character string.

In one embodiment, user 101 may be presented with the option to provide further additions and updates to the modified content (e.g., character string 2) after registration is confirmed. For example, if character string 2 403 contains the user's confidential or personal information, then user 101 may want to hide that confidential or personal information in the character string or replace the confidential or personal information in the character string with non-confidential or non-personal information.

In one embodiment, user 101 may be presented with the option to provide further additions and updates to the modified content (e.g., character string 2) before registration.

In step 306, document manager 104 associates the registered character strings with a unique key as shown in FIG. 4. In one embodiment, the unique key is stored in repository 102 along with the information discussed in step 305. In one embodiment, such information (information discussed in steps 305, 306) may be stored together in a "record" in repository 102 associated with character strings 1 and 2. Referring to FIG. 4, a unique key 408 is associated with the registered character strings. In one embodiment, user 101 is presented the option to register 409 or cancel registration 410.

In one embodiment, unique key 408 may be used by user 101 to obtain a value, such as character string 2, associated with the copied content (e.g., character string 1) as discussed further below. In one embodiment, the value associated with unique key 408 may pertain to the modified parameters of the user's computing environment, which may subsequently be shared by multiple users using the same unique key 408.

Referring to step 304, if, however, the difference between character strings 1 and 2 does not exceed a threshold value, then, in step 307, character strings 1 and 2 are not registered in repository 102.

By registering characters strings in repository 102 as discussed above, when other users copy a registered character string (e.g., character string 1 402) from an electronic document, the user may be presented with the modified character string (e.g., character string 2 403). In this manner, the modified contents may be shared and used by other users.

After registering character strings in repository 102, document manager 104 assists the user in executing content copied from an electronic document in the user's computing environment by assisting the user in recognizing the parameters that need to be modified and how such modifications should be performed in the user's computing environment as discussed below in connection with FIG. 5.

FIG. 5 is a flowchart of a method 500 for assisting the user in executing the content copied from an electronic document by assisting the user in recognizing the parameters that need to be modified and how such modifications should be performed in the user's computing environment in accordance with an embodiment of the present invention.

Referring to FIG. 5, in conjunction with FIGS. 1-4, in step 501, document manager 104 detects the copying of content (e.g., exemplary command) from an electronic document (may be the same or a different electronic document than the electronic document of step 301) by a user 101 (can be a different user 101 than who copied content in step 301).

In step 502, a determination is made by document manager 104 as to whether the copied content matches a record stored in repository 102 within a threshold degree of agreement. "Record," as used herein, refers to the information stored in repository 102 pertaining to the registration of character strings 1 and 2 as discussed above in connection with steps 305-306.

In one embodiment, the copied content is compared with previously stored character strings in repository 102, such as character string 1 402, character by character. In one embodiment, taking into account the number of characters in the character strings, the determination of step 502 involves determining if the percentage of characters that match exceeds a threshold value, which may be user-selected. If the percentage of characters that match exceeds the threshold value, then the copied content is deemed to match a record stored in repository 102 within a threshold degree of agreement. Otherwise, the copied content is deemed to not match a record stored in repository 102 within a threshold degree of agreement.

If the copied content does not match a record stored in repository 102 within a threshold degree of agreement, then, in step 503, document manager 104 enables the normal copy and paste operation.

If, however, the copied content does match a record stored in repository 102 within a threshold degree of agreement, then, in step 504, document manager 104 provides a notification (e.g., visual or audible) to user 101 indicating that the copied content may need to be modified in order to be executed in the user's computing environment. For example, if user 101 copied content from the electronic document that matches character string 1 402, then the copied content may need to be modified as character string 2 403 in order to be executed in the user's computing environment.

In step 505, document manager 104 detects the selection of a paste operation to paste the copied content into the user's computing environment by user 101.

In step 506, document manager 104 temporarily disables the paste operation from being fully executed.

In step 507, document manager 104 presents modification point(s) 406 of the copied content, and possibly multiple modification points 406 for the same character location, to user 101, such as via a combo box or a selection box.

In one embodiment, modification point(s) 406 are obtained from the record associated with the matching character string (e.g., character string 1 402), where the matching character string was modified (e.g., character string 2 403) to enable execution of the copied content in the user's computing environment. For example, referring to FIG. 4, if user 101 copied content (e.g., exemplary command) from an electronic document (e.g., user guide) that matches character string 1 402 stored in a record of repository 102 within a threshold degree of agreement, then user 101 would be presented with modification points 406 associated with the record of character string 1 402. As previously discussed, such modification points 406 may include the modified parameters to enable execution of the copied content in the user's computing environment.

In one embodiment, in connection with presenting modification points 406 to user 101, user 101 may also be presented with the modified character string incorporating such modification points 406. In one embodiment, modification points 406 are highlighted to clearly illustrate the differences with the original copied content. In one embodiment, user 101 may be presented the opportunity to select one or more of the presented modification points 406 to be implemented. In response to such selection, document manager 104 may enable the pasting of the copied content modified according to the selected modification points 406 into the user's computing environment as discussed below.

In one embodiment, user 101 may select the particular modification points 406 to be implemented by presenting a key, such as the unique key 408 associated with character strings 1 and 2 402, 403. If user 101 copied content that matches character string 1 402, then by presenting unique key 408 to document manager 104, document manager 104 may present a value, such as character string 2 403 associated with character string 1 402 and unique key 408.

In one embodiment, modification points 406 may be automatically selected by document manager 104. In one embodiment, modification points 406 are selected from the most recent item, an item made by a highly-experienced user, an item with a high usage frequency by other users, etc.

In step 508, document manager 104 enables the paste operation to paste the copied content (e.g., exemplary command) into the user's computing environment (pasted into a text field in a dialog box) to be executed in light of the user's selection of modification point(s) 406 thereby allowing the pasting of the copied content with modification points 406 selected by user 101.

In this manner, the present invention assists the user in recognizing the parameters that need to be modified and how such modifications should be performed in the user's computing environment in order to implement the execution of content (e.g., exemplary command) copied from an electronic document.

Furthermore, the present invention improves the technology or technical field involving document systems. Currently, in such systems, users may simply copy and paste exemplary commands into their user computing environment. For example, the user may copy an exemplary command into a text field in a dialog box. For instance, the user may copy the command of prompting the user to enter a new user's password in the text field in the dialog box. However, in order to implement the execution of the command in the user's computing environment, various parameter adjustments or other modifications may be required in the user's computing environment. It may not be clear what parameters (e.g., location parameters) should be modified and to what extent such parameters should be changed. Configuration mistakes are common. As a result, users may unnecessarily expend computing resources, such as processing resources, in attempting to execute the copied content in the user's computing environment. Such over utilization of resources results in inefficient use of the computing resources (e.g., processing resources). By implementing the present invention, computing resources (e.g., processing resources) are more efficiently utilized since the user does not need to expend unnecessary computing resources in attempting to execute the copied content in the user's computing environment. That is, the computer capabilities of document systems are improved since fewer computing resources need to be utilized in order to execute the copied content (e.g., exemplary command) in the user's computing environment.

An alternative embodiment for assisting the user in executing the content copied from an electronic document by assisting the user in recognizing the parameters that need to be modified and how such modifications should be performed in the user's computing environment is discussed below in connection with FIG. 6.

FIG. 6 is a flowchart of an alternative method 600 for assisting the user in executing the content copied from an electronic document by assisting the user in recognizing the parameters that need to be modified and how such modifications should be performed in the user's computing environment.

Referring to FIG. 6, in conjunction with FIGS. 1-4, in step 601, document manager 104 detects user 101 (can be a different user 101 than who copied content in step 301) opening an electronic document (may be the same or a different electronic document than the electronic document of step 301) for browsing. In one embodiment, document manager 104 may detect searches performed by user 101 in a web browser directed to particular documents, such as user guides. For example, document manager 104 may utilize natural language processing to identify keywords, such as "user's guide" or "manual," entered by user 101 in a search engine.

In step 602, document manager 104 searches for content in the electronic document that matches the registered character strings, such as character string 1 402, in repository 102.

In step 603, a determination is made by document manager 104 as to whether there is content in the electronic document that matches a record stored in repository 102 within a threshold degree of agreement.

In one embodiment, content in the electronic document is compared with previously stored character strings in repository 102, such as character string 1 402, character by character. In one embodiment, taking into account the number of characters in the character strings, document manager 104 determines if the percentage of characters that match exceeds a threshold value, which may be user-selected. If the percentage of characters that match exceeds the threshold value, then that content in the electronic document is said to match. Otherwise, the content is deemed to not match any character strings in repository 102.

If there are no matches with the registered character strings within a threshold degree of agreement, then, in step 604, document manager 104 enables the normal copy and paste operation.

If, however, there is a match with a registered character string within a threshold degree of agreement, then, in step 605, document manager 104 identifies modification points 406 that are associated with the matching character string, such as character string 1 402.

In step 606, document manager 104 detects user 101 copying the content (the content that was previously found to match a registered character string in repository 102 in steps 602-603) from the electronic document that matches the registered character string in repository 102.

In step 607, document manager 104 presents modification point(s) 406 of the copied content, and possibly multiple modification points 406 for the same character location, to user 101, such as via a combo box or a selection box. In one embodiment, modification point(s) 406 are obtained from the record associated with the matching character string (e.g., character string 1 402), where the matching character string was modified (e.g., character string 2 403) to enable execution of the copied content in the user's computing environment. For example, referring to FIG. 4, if user 101 copied content (e.g., exemplary command) from an electronic document (e.g., user guide) that matches character string 1 402 stored in a record of repository 102 within a threshold degree of agreement, then user 101 would be presented with modification points 406 associated with the record of character string 1 402. As previously discussed, such modification points 406 may include the modified parameters to enable execution of the copied content in the user's computing environment.

In one embodiment, in connection with presenting modification points 406 to user 101, user 101 may also be presented with the modified character string incorporating such modification points 406. In one embodiment, modification points 406 are highlighted to clearly illustrate the differences with the original copied content. In one embodiment, user 101 may be presented the opportunity to select one or more of the presented modification points 406 to be implemented. In response to such selection, document manager 104 may enable the pasting of the copied content modified according to the selected modification points 406 into the user's computing environment as discussed below.

In one embodiment, modification points 406 may be automatically selected by document manager 104. In one embodiment, modification points 406 are selected from the most recent item, an item made by a highly-experienced user, an item with a high usage frequency by other users, etc.

In step 608, document manager 104 enables the paste operation to paste the copied content (e.g., exemplary command) into the user's computing environment (pasted into a text field in a dialog box) to be executed in light of the user's selection of modification point(s) 406 thereby allowing the pasting of the copied content with modification points 406 selected by user 101.

In this manner, the present invention assists the user in recognizing the parameters that need to be modified and how such modifications should be performed in the user's computing environment in order to implement the execution of content (e.g., exemplary command) copied from an electronic document.

Furthermore, the present invention improves the technology or technical field involving document systems. Currently, in such systems, users may simply copy and paste exemplary commands into their user computing environment. For example, the user may copy an exemplary command into a text field in a dialog box. For instance, the user may copy the command of prompting the user to enter a new user's password in the text field in the dialog box. However, in order to implement the execution of the command in the user's computing environment, various parameter adjustments or other modifications may be required in the user's computing environment. It may not be clear what parameters (e.g., location parameters) should be modified and to what extent such parameters should be changed. Configuration mistakes are common. As a result, users may unnecessarily expend computing resources, such as processing resources, in attempting to execute the copied content in the user's computing environment. Such over utilization of resources results in inefficient use of the computing resources (e.g., processing resources). By implementing the present invention, computing resources (e.g., processing resources) are more efficiently utilized since the user does not need to expend unnecessary computing resources in attempting to execute the copied content in the user's computing environment. That is, the computer capabilities of document systems are improved since fewer computing resources need to be utilized in order to execute the copied content (e.g., exemplary command) in the user's computing environment.

Hence, by incorporating the present invention, when operations are performed in a computing environment based on examples presented in an electronic document, the past modified contents for other users may be shared and used by the user. Necessary modified contents may be more easily understood by the users. Furthermore, operational mistakes can be reduced and the overall usability will be improved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
a memory for storing a computer program for assisting users to execute content in a user's computing environment; and
a processor connected to the memory, wherein the processor is configured to execute the program instructions of the computer program comprising:
    detecting a first user copying content from a first electronic document, wherein said content is set as a first character string;
    detecting a pasting of said copied content into a first user's computing environment;
    detecting a modification of said copied content, wherein said modification comprises modification of parameters of said first user's computing environment to implement execution of said copied content, wherein said modification of said copied content is set as a second character string, wherein said first user's computing environment comprises a set of packages, variables and files that are present in a computing device of said first user;
    determining whether a difference between said first and second character strings exceeds a threshold value, wherein said determination is accomplished by comparing each character in each of said first and second character strings and identifying any differences;
    registering said first and second character strings and differences between said first and second character strings in a repository in response to said identified differences exceeding said threshold value;

registering modification points and a range of locations in said second character string exhibiting differences from said first character string in said repository in response to said identified differences exceeding said threshold value, wherein said modification points comprise modifications in said second character string with respect to said first character string, wherein said modification points comprise modified parameters of said first user's computing environment to enable execution of content copied from said first electronic document in said first user's computing environment, wherein said range of locations in said second character string comprises locations in said second character string containing said modifications;

presenting to said first user a dialog to provide said first user an opportunity to confirm registration of said first and second character strings as well as to confirm said identified differences, said modification points and said range of locations in said second character string exhibiting differences from said first character string;

associating said registered first and second character strings with a unique key, wherein said unique key is stored in said repository;

detecting a second user copying content from a second electronic document into a second user's computing environment;

determining whether said copied content from said second electronic document matches said first character string in said repository within a threshold degree of agreement by comparing said copied content from said second electronic document with said first character string character by character, wherein said copied content from said second electronic document is deemed to match said first character string in said repository within said threshold degree of agreement in response to a percentage of characters matching exceeding a value;

providing a notification to said second user indicating said copied content from said second electronic document may need to be modified in order to be executed in said second user's computing environment in response to said copied content from said second electronic document not matching said first character string in said repository within said threshold degree of agreement;

detecting a selection of a paste operation to paste said copied content from said second electronic document into said second user's computing environment in response to said copied content from said second electronic document matching said first character string in said repository within said threshold degree of agreement, wherein said second user's computing environment comprises a set of packages, variables and files that are present in a computing device of said second user; and presenting to said second user one or more of said registered modification points associated with said second character string stored in said repository via a combo box or a selection box.

2. The system as recited in claim 1, wherein said unique key is used to obtain said second character string.

3. The system as recited in claim 1, wherein the program instructions of the computer program further comprise:
presenting to said second user said second character string incorporating said one or more presented modification points, wherein said one or more presented modification points are highlighted.

4. The system as recited in claim 3, wherein the program instructions of the computer program further comprise:
automatically selecting one or more of said one or more presented modification points to be implemented.

5. The system as recited in claim 3, wherein the program instructions of the computer program further comprise:
presenting to said second user an opportunity to select one or more of said one or more presented modification points to be implemented.

6. The system as recited in claim 5, wherein said second user selects one or more of said one or more presented modification points by presenting said unique key.

7. The system as recited in claim 5, wherein the program instructions of the computer program further comprise:
enabling pasting of said copied content from said second electronic document modified according to said selected one or more presented modification points into said second user's computing environment.

8. The system as recited in claim 1, wherein the program instructions of the computer program further comprise:
temporarily disabling said paste operation from being fully executed in response to detecting said selection of said paste operation to paste said copied content from said second electronic document into said second user's computing environment.

9. The system as recited in claim 8, wherein the program instructions of the computer program further comprise:
enabling said paste operation to paste said copied content from said second electronic document into said second user's environment in response to a selection of one or more of said one or more presented modification points thereby allowing a pasting of said copied content from said second electronic document into said second user's computing environment with said one or more modification points selected by said second user.

10. The system as recited in claim 1, wherein said copied content comprises an exemplary command.

11. A computer program product for assisting users to execute content in a user's computing environment, the computer program product comprising a computer readable storage medium having program code embodied therewith, the program code comprising the programming instructions for:
detecting a first user copying content from a first electronic document, wherein said content is set as a first character string;
detecting a pasting of said copied content into a first user's computing environment;
detecting a modification of said copied content, wherein said modification comprises modification of parameters of said first user's computing environment to implement execution of said copied content, wherein said modification of said copied content is set as a second character string, wherein said first user's computing environment comprises a set of packages, variables and files that are present in a computing device of said first user;
determining whether a difference between said first and second character strings exceeds a threshold value, wherein said determination is accomplished by comparing each character in each of said first and second character strings and identifying any differences;
registering said first and second character strings and differences between said first and second character strings in a repository in response to said identified differences exceeding said threshold value;

registering modification points and a range of locations in said second character string exhibiting differences from said first character string in said repository in response to said identified differences exceeding said threshold value, wherein said modification points comprise modifications in said second character string with respect to said first character string, wherein said modification points comprise modified parameters of said first user's computing environment to enable execution of content copied from said first electronic document in said first user's computing environment, wherein said range of locations in said second character string comprises locations in said second character string containing said modifications;

presenting to said first user a dialog to provide said first user an opportunity to confirm registration of said first and second character strings as well as to confirm said identified differences, said modification points and said range of locations in said second character string exhibiting differences from said first character string;

associating said registered first and second character strings with a unique key, wherein said unique key is stored in said repository;

detecting a second user copying content from a second electronic document into a second user's computing environment;

determining whether said copied content from said second electronic document matches said first character string in said repository within a threshold degree of agreement by comparing said copied content from said second electronic document with said first character string character by character, wherein said copied content from said second electronic document is deemed to match said first character string in said repository within said threshold degree of agreement in response to a percentage of characters matching exceeding a value;

providing a notification to said second user indicating said copied content from said second electronic document may need to be modified in order to be executed in said second user's computing environment in response to said copied content from said second electronic document not matching said first character string in said repository within said threshold degree of agreement;

detecting a selection of a paste operation to paste said copied content from said second electronic document into said second user's computing environment in response to said copied content from said second electronic document matching said first character string in said repository within said threshold degree of agreement, wherein said second user's computing environment comprises a set of packages, variables and files that are present in a computing device of said second user; and presenting to said second user one or more of said registered modification points associated with said second character string stored in said repository via a combo box or a selection box.

12. The computer program product as recited in claim 11, wherein said unique key is used to obtain said second character string.

13. The computer program product as recited in claim 11, wherein the program code further comprises the programming instructions for:
presenting to said second user said second character string incorporating said one or more presented modification points, wherein said one or more presented modification points are highlighted.

14. The computer program product as recited in claim 13, wherein the program code further comprises the programming instructions for:
automatically selecting one or more of one or more said presented modification points to be implemented.

15. The computer program product as recited in claim 13, wherein the program code further comprises the programming instructions for:
presenting to said second user an opportunity to select one or more of said one or more presented modification points to be implemented.

16. The computer program product as recited in claim 15, wherein said second user selects one or more of said one or more presented modification points by presenting said unique key.

17. The computer program product as recited in claim 15, wherein the program code further comprises the programming instructions for:
enabling pasting of said copied content from said second electronic document modified according to said selected one or more presented modification points into said second user's computing environment.

18. The computer program product as recited in claim 11, wherein the program code further comprises the programming instructions for:
temporarily disabling said paste operation from being fully executed in response to detecting said selection of said paste operation to paste said copied content from said second electronic document into said second user's computing environment.

19. The computer program product as recited in claim 18, wherein the program code further comprises the programming instructions for:
enabling said paste operation to paste said copied content from said second electronic document into said second user's environment in response to a selection of one or more of said one or more presented modification points thereby allowing a pasting of said copied content from said second electronic document into said second user's computing environment with said one or more modification points selected by said second user.

20. The computer program product as recited in claim 11, wherein said copied content comprises an exemplary command.

* * * * *